(12) United States Patent
Yu

(10) Patent No.: US 9,332,171 B2
(45) Date of Patent: May 3, 2016

(54) METHOD FOR TRANSMITTING VIDEO DATA AND HAPTIC DATA AND VIDEO ACQUISITION DEVICE

(76) Inventor: Lang Yu, Beijing (CN)

( * ) Notice: Subject to any disclaimer, the term of this patent is extended or adjusted under 35 U.S.C. 154(b) by 569 days.

(21) Appl. No.: 13/988,233

(22) PCT Filed: Nov. 17, 2011

(86) PCT No.: PCT/CN2011/082344
§ 371 (c)(1),
(2), (4) Date: Jul. 29, 2013

(87) PCT Pub. No.: WO2012/065560
PCT Pub. Date: May 24, 2012

(65) Prior Publication Data
US 2014/0071291 A1 Mar. 13, 2014

(30) Foreign Application Priority Data

Nov. 21, 2010 (CN) .......................... 2010 1 0567050

(51) Int. Cl.
*H04N 5/228* (2006.01)
*H04N 5/232* (2006.01)
*H04N 7/18* (2006.01)
*G06F 3/01* (2006.01)
*H04N 7/15* (2006.01)

(52) U.S. Cl.
CPC ............ *H04N 5/23206* (2013.01); *G06F 3/016* (2013.01); *H04N 7/185* (2013.01); *H04N 7/157* (2013.01)

(58) Field of Classification Search
CPC ... H04N 5/23206; H04N 7/185; H04N 7/157; H04N 1/00204; H04N 1/00217; G06F 3/016; H04L 69/00; H04L 67/00
USPC ................. 348/222.1, 207.1, 207.11, 211.99, 348/211.1–211.5; 705/105, 112–120; 209/217–219, 245
See application file for complete search history.

(56) References Cited

U.S. PATENT DOCUMENTS

| 7,305,357 | B2 * | 12/2007 | Hamilton ........... G06Q 30/0641 348/E7.073 |
| 7,508,941 | B1 | 3/2009 | O'3 Toole, Jr. et al. |
| 8,516,050 | B1 * | 8/2013 | Chapweske ........ H04N 1/00204 709/204 |
| 8,595,324 | B2 * | 11/2013 | Carrigan ................. G06F 3/023 709/217 |
| 2006/0047668 | A1 * | 3/2006 | Kang ....................... H04N 5/44 |
| 2009/0204689 | A1 * | 8/2009 | Chipman .......... G08B 13/19656 709/219 |

FOREIGN PATENT DOCUMENTS

| CN | 1845602 | 10/2006 |
| CN | 1913533 | 2/2007 |
| CN | 201035117 | 3/2008 |
| CN | 101178843 | 5/2008 |
| CN | 101263535 | 9/2008 |
| WO | WO 2009097157 | 8/2009 |

* cited by examiner

*Primary Examiner* — Yogesh Aggarwal
(74) *Attorney, Agent, or Firm* — Dority & Manning, P.A.

(57) ABSTRACT

A method for transmitting video data and haptic data between a mobile video acquisition device and a remote computer through a communication network, and a video acquisition device. A server capable of direct communication exists in the communication network. The video data can be presented on a screen of the remote computer for a user to view, and the haptic data can be used to control a motion state of the video acquisition device acting as an avatar of the user. In the present invention, a first channel for transmitting video data and a second channel for transmitting haptic data are established between a computer having access to the Internet and a video acquisition device having access to the Internet by using a server and through a P2P technology. The present invention enables forming of a low-cost long-distance avatar network of multiple users versus multiple avatars, thereby greatly reducing travel of people, and contributing to low carbon environmental protection.

10 Claims, 2 Drawing Sheets

METHOD FOR TRANSMITTING VIDEO DATA AND HAPTIC DATA AND VIDEO ACQUISITION DEVICE

This application claims the benefit of priority to PCT International Application Serial No. PCT/CN2011/082344 filed on Nov. 17, 2011, which claims filing benefit of Chinese Patent Application No. 201010567050.X, entitled "METHOD FOR TRANSMITTING VIDEO DATA AND HAPTIC DATA AND VIDEO ACQUISITION DEVICE", filed with the Chinese Patent Office on Nov. 21, 2010, which are incorporated herein by reference in their entirety.

FIELD OF THE INVENTION

The present invention relates to a method for transmitting video data and haptic data, and relates to a video acquisition device.

BACKGROUND OF THE INVENTION

With the integration of power technology and information technology, the device utilizing automation technology, computer technology and communication technology can be used as the physical avatar of people, and can extend the people's visual sense and haptic sense, so it can realize the user's exploration of the distant environment.

First of all, the attempts to extend the people's visual sense and haptic sense with avatars were implemented in currently very popular WLAN (Wireless Local Area Network). The WLAN has the high bandwidth, and can transmit video data and haptic data smoothly. A video acquisition device with a camera can provide video data, and a joystick that is subordinate to PC can provide haptic data, which can be used to control the movement speed of the mobile video acquisition device. Some universities and research institutes have studied the transmission of video data and haptic data through WLAN. In LAN, the client/server architecture is used to transmit video data and haptic data with TCP protocol or UDP protocol. Shandong Electric Power Research Institute of China developed a substation inspect robot, and a video acquisition device is located in the mobile body of the robot, which is connected through WLAN with the computer for human-machine interaction through WLAN. The computer receives various instructions of the operator and gives the instructions to the mobile body of robot. In the other hand, the computer analyzes the images from the robot. If the images aren't normal, the computer transmits data to a higher level and gives alarms. The communication distance of WLAN is short, and it limits the application scope of the technology which is used to transmit video data and haptic data through LAN.

With the development of the 3G telecommunication network, the long-distance transmission of video data and haptic data becomes possible, and telecom operators in many countries have started to attempt it. Patent Application Publication CN200910176998 provides a method for transmitting video data and haptic data and provides a video acquisition device. A user views the video acquired by video acquisition device in the phone screen. And with the phone keyboard, user can input haptic data, such as going forward, going backward, turning left, turning right and the like, which are transmitted to the video acquisition device and are used to control its motion. In this system, the cost of data transmission through 3G network is relative higher. And in order to connect data channels between the phone and the data acquisition device, the complex telecom signaling is required. In addition, the haptic signals inputted from phone keyboard are simple, so the control effect on the video acquisition device is not good enough.

In the dedicated communication channel, video data and haptic data can be transmitted to more distant place. The lunar rover vehicle is an example. The operator sits in front of the screen of the ground control center, and the lunar rover returns images of the moon surface which are displayed on the screen. According to these images, the operator gives the control instructions. The haptic data including the control instructions are transmitted to the lunar rover vehicle, and help the lunar rover to avoid obstacle and go ahead. Due to the dedicated communication channel, the cost is very high. In addition, there is single-to-single communication between the ground computer and the lunar rover vehicle, and the large-scale communication network is not formed.

On the Internet, P2P (Peer to Peer) technology is applied more and more widely. With the P2P Technology, multimedia files can be transferred directly between two computers which have no globally accessible IP address (also known as public IP address). The computers are connected to the Internet through routes with globally accessible IP address. The IP address of the computer is also called private IP address. Both of the two computers can communicate with the server in the Internet. The routers perform the Network Address Translation (NAT). The source IP address and port number PortA of the UDP packet from the computer are replaced with the router's IP address and port number PortB, which is allocated to the computer by the router. And the router transmits the packets whose destination port number is PortB to the computer. The two computers can transmit the file data directly, after the public IP address and communication port number PortB of the opposite party is known through the server. P2P is well-known technology, and it isn't described in detail here. The distance between the two computers may be long, and these computers may be located in different buildings of one city, and may be located in different cities, and may be located in different countries. In addition, most of the computers having access to the Internet can transfer the multimedia files to each other with the P2P technology, and a network of multiple computers versus multiple computers is formed.

Compared with wireless local area network, the existing Internet has the advantage of long-distance.

Compared with 3G telecommunication network, the existing Internet has the advantage of low-cost.

Compared with dedicated communication channels, the advantage of the existing Internet is that there are many positions having access to Internet.

SUMMARY OF THE INVENTION

To this end, the objects of the present invention are to provide a method for transmitting video data and haptic data, and a video acquisition device, to form a low-cost, long-distance avatar network of multiple users versus multiple avatars, thereby greatly reducing the travel of people and contributing to low carbon environmental protection.

In the method according to the present invention, video data and haptic data are transmitted between local mobile video acquisition devices and remote computers through a communication network, and a server capable of direct communication exists in the communication network, and the video data are presented on a screen of a remote computer for a user to view, and the haptic data are used to control the motion state of the video acquisition device. The method according the invention includes the following steps: registering, by the video acquisition devices, visual address information and haptic address information on the server respectively and regularly; inputting, by a user, an identification of a video acquisition device into a remote computer; registering, by the remote computer, visual address information and haptic address information on the server respectively; sending, by the remote computer, a request signaling containing the identification of the video acquisition device to the server; searching, by the server, the visual address information and the haptic address information corresponding to the video acquisition device according to the identification of the video acquisition device, and informing the remote computer of the visual address information and the haptic address information; informing, by the server, the video acquisition device of the request signaling, the visual address information and the haptic address information corresponding to the remote computer according to the identification of the video acquisition device; establishing, by the remote computer and the video acquisition device, a first channel for transmitting the video data directly and a second channel for transmitting the haptic data directly, according to the visual address information and the haptic address information from the server; sending, by the video acquisition device, the video data to the remote computer directly by using the first channel; and sending, by the remote computer, the haptic data to the video acquisition device directly by using the second channel; wherein the haptic data are a set of sample values of state.

Herein, the video acquisition device may be regarded as an avatar of the user in front of the remote computer.

Herein, the address information may include an IP address and a port number and the communication network may be a combination of the Internet and WLAN (for example, the video acquisition devices may be connected with wireless routers firstly, and the wireless routers are located directly in the Internet). The remote computers and the video acquisition devices may have no Internet IP address, also called public IP address. Then the address information recorded in the server contains the public IP address of the router which is the nearest router away from the video acquisition device or remote computer, and contains the port number which is allocated by the router to the video acquisition device or the remote computer.

As can be seen from above, according to the method of the present invention, the P2P technology is used to transmit video and haptic data between users and avatars, and rich haptic information can be sent from the computers having access to the Internet to the video acquisition devices having access to the Internet, and visual information can be sent from the video acquisition devices having access to the Internet to the computers having access to the Internet.

The method according to the present invention is different from the method for extending the people's visual sense and haptic sense by means of avatars in the local area network. According to the method of the invention, the people's visual sense and haptic sense can be extended over a long distance by means of avatars. The transmission distance of the wireless local area network is only hundreds of meters, and the transmission distance of the Internet may be thousands of kilometers. The users and avatars may be located in different buildings of one city, and may be located in different cities, and may also be located in different countries.

The method according to the present invention is different from the method for extending the people's visual sense and haptic sense by means of avatars in the 3G telecommunication network. The transmitted haptic information is more abundant, and is not limited to the simple haptic information inputted from the phone keyboard, such as forward, backward and the like. With the computer peripheral devices like joystick, a set of sample values of the specified motion state (such as a given speed curve) can be inputted. At the same time, the communication cost is lower, and the signaling for establishing the connection between users and avatars is simpler.

The method according to the present invention is different from the method for extending the people's visual sense and haptic sense by means of avatars in the dedicated communication channels. The restriction for the user's position and the avatar's position is less. In the case that the user's computer and the video acquisition device have access to the Internet and the bandwidth of the communication network is high, the connection between the user and the avatar can be established. And multiple users and multiple avatars can be connected with the Internet. In addition, it reduces the cost to use the combination of the Internet and the wireless local area network.

In a word, compared with the prior art, the avatar network which is formed using the method according to the invention has stronger functions and has lower cost. Therefore, the present invention lays the foundation for the large-scale commercial application of the avatar network which integrates the power technology and the information technology. Further, the travel of people can be reduced greatly, consequently, the carbon emission can be reduced and the environment can be protected.

In one advantageous variant of the present invention, the video data include a plurality of compressed data of video frames. The compressed data of video frames can be divided into a plurality of groups of data packets, which match the bandwidth. The groups of data packets are sent at intervals of given time. If the compressed data for the last video frame hasn't been sent, the compressed data for the newly acquired video frame is not sent to the remote computer. Because the bandwidth of the Internet is less than the bandwidth of LAN, according to the variant, the clear video image can be transmitted in the condition of not enough bandwidth of the Internet. It helps users send further haptic data according to the visual information.

In another advantageous variant of the present invention, the video data acquired by video acquisition device are stored in the video acquisition device, part of video data is transmitted to the remote computer, and the user sends haptic data to the video acquisition device according to the received video data. Therefore, for the media industry, users can control the motion of video acquisition devices according to the part of video data, in order to record the desired content. Even in the condition of the limited bandwidth of the Internet, the complete video data stored in video acquisition devices can be acquired and be further post processed.

In a further advantageous variant of the invention, the video acquisition device sends haptic data to the remote computer. Therefore, according to the given motion state from the joystick and actual motion state from the video acquisition device, the remote computer can determine the haptic data to be sent, and a close-loop network control system forms. With subsidiary sensors, the video acquisition device can obtain a set of sample values of the actual motion state.

In another advantageous variant of the invention, the server manages access permissions of remote computers and video acquisition devices. For example, when the remote computer registers address information on the server, the remote computer is allowed to register only if the correct user name and password are inputted.

In the device aspect of the present invention, the present invention relates a mobile video acquisition device, which comprises an electromechanical unit for moving, an input unit for acquiring video data, a computing unit for processing video data and haptic data, and a communication unit for receiving and sending video data and haptic data. The video acquisition device is connected with the Internet and transmits video data and haptic data according to the method of the present invention.

Other advantages of the present invention can be obtained from the following specific exemplary embodiments.

BRIEF DESCRIPTION OF THE DRAWINGS

The following text further explains the invention according its embodiments with reference to the accompanying drawings.

DETAILED DESCRIPTION

Figure 1:
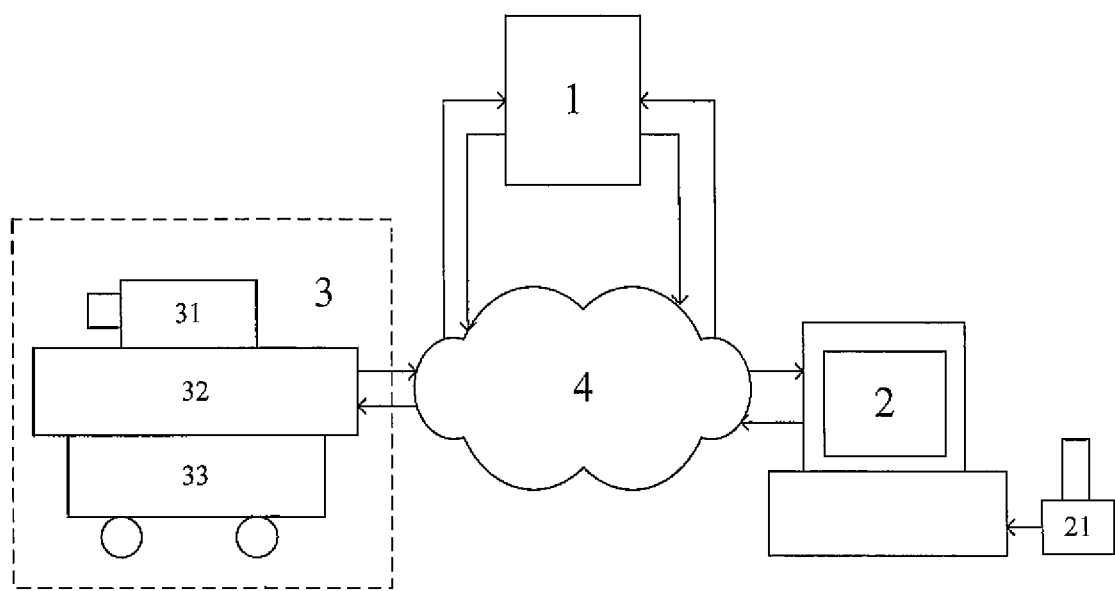
FIG. 1 is the system structure diagram of the avatar network including the device according to the present invention.

FIG. 1 shows the system architecture of an avatar network including devices of the present invention. The avatar network includes multiple video acquisition devices 3 (only one is shown in the figure for simplification), multiple remote computers 2 (only one is shown in the figure for simplification), a server 1 which is located in the Internet and has a public IP address, and a communication network 4. The communication network 4 may be the combination of the Internet, wired LAN and wireless LAN. The video acquisition devices 3 are located in locales where content is provided, and the remote computers 2 are in front of remote users. The video acquisition devices 3 are connected with the server 1 through the communication network 4 including wireless LAN and the Internet. The remote computers 2 are connected with the server 1 through the communication network 4 including the wired LAN and the Internet. By the aid of the server 1, according to the process described by FIG. 2, the remote computers 2 and the video acquisition devices 3 can be connected through the communication network 4 for transmitting video data and haptic data.

The remote computers 2 may have the private IP address of LAN, and are connected with the Internet through routers which have public IP address. Remote computers 2 are in front of users, and are equipped with joysticks 21. Users obtain the locale video information through the screen of remote computers 2, and give haptic information through joysticks 21 according to the intention of users. The haptic information will affect the speed and the position of video acquisition devices 3. The video information acquired by video acquisition devices 3 is changed due to the movement of video acquisition devices 3. Therefore, viewed from the locale content, the remote users interacts with the locale dynamically, and viewed from the users, video acquisition devices 3 can be regarded as avatars of users.

As an avatar of a user, it is unnecessary for a video acquisition device 3 to have the public IP address. The video acquisition device 3 may have a private IP address of wireless LAN, and be connected with the Internet through wireless gateways. The video acquisition device 3 includes an video input unit 31, a computing unit 32 for processing video data and haptic data, an electromechanical unit 33 for moving according to the haptic data, and a communication unit (not shown) for transmitting the video data and haptic data.

The electromechanical unit 33 can be regarded as "feet" of the avatar. The electromechanical unit 33 includes wheels, a driving mechanism, a DC motor for driving the wheels and a stepper motor, a power electronic device for controlling the motor and a battery serving as a power source. For example, the power electronic device can receive PWM signals from the computing unit 32, and determine the speed of the DC motor, and then control the speed of wheels according to the duty ratio of PWM signals. The PWM signals are generated according to the haptic data.

The video input unit 31 can be regarded as "eyes" of the avatar. The video input unit 31 includes a CCD camera or a CMOS camera, a video capture card and a pan unit. For example, the video capture card can be connected with the computing unit 32 through the PCI Bus. The computing unit 32 can send instructions related to video capture to the video capture card. The video input unit 31 can be equipped with multiple cameras, in order to acquire video information from a plurality of views or achieve three-dimensional effect.

The computing unit 32 and the communication unit of the video acquisition device process and transmit video data and haptic data which are related to the "feet" or "eyes" of the avatar. They can be realized with the industrial computer and the WLAN card. For example, the video frame information from the video input unit 31 can be compressed into a plurality of data packets less than 1 KB, and be sent to the remote computer 2. Data packets from the remote computer 2 containing haptic data are converted into PWM signals, and then are inputted into the electromechanical unit 33 of the video acquisition device 3.

Figure 2:
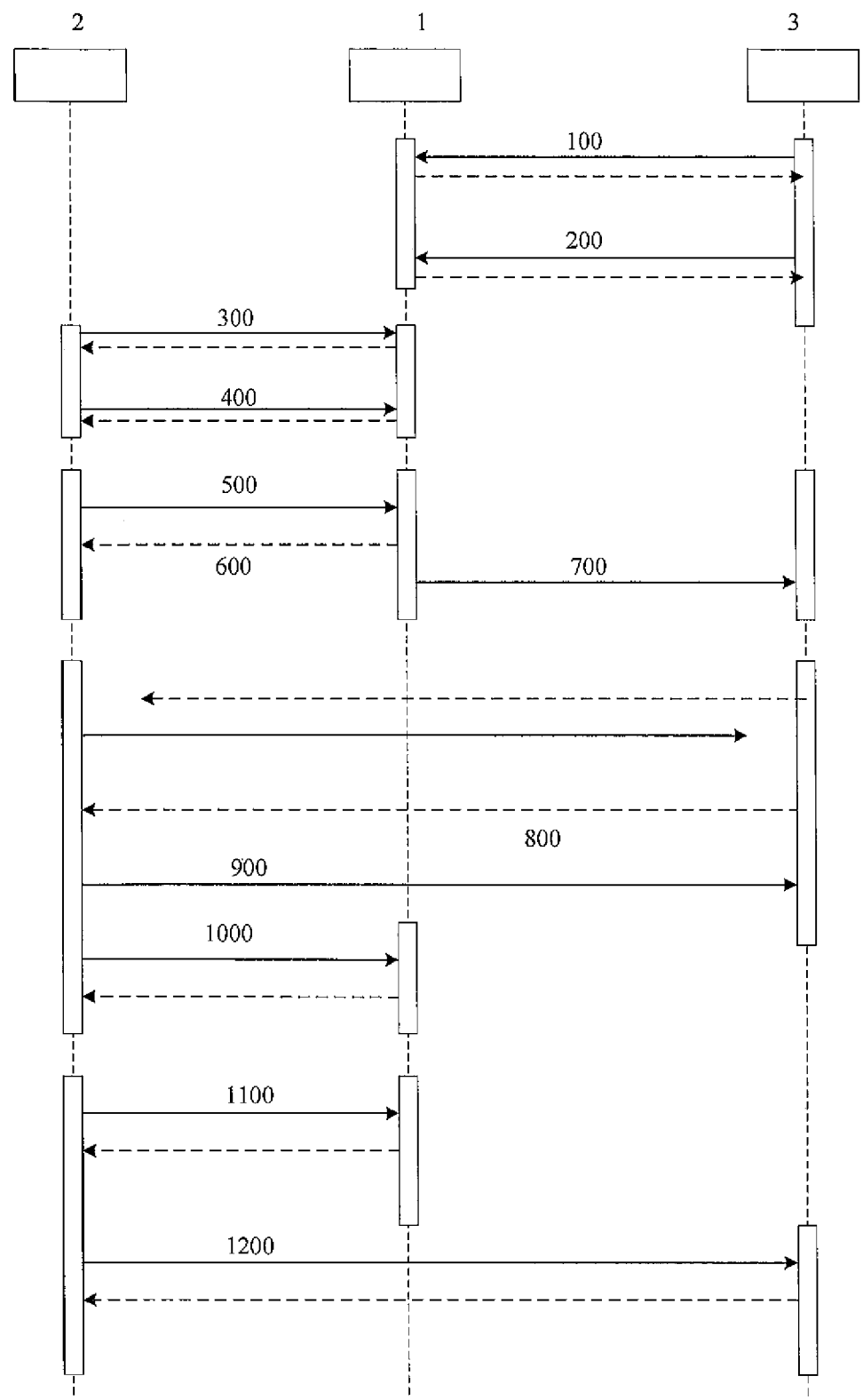
FIG. 2 is the flowchart of the method according to the present invention.

FIG. 2 shows a flowchart of the method according to the present invention. The flowchart illustrates the process of the method according the present invention. The whole process relates to the local video acquisition devices 3, the remote computers 2 and the server 1 located in the Internet, which are shown in FIG. 1.

After a video acquisition device 3 is powered up, at least two UDP channels between a video acquisition device 3 and a nearest router with a public IP address should be maintained. The first UDP channel is used to transmit video data from the video acquisition device 3 to the remote computer 2, and the second UDP channel is used to transmit haptic data from the remote computer 2 to the video acquisition device 3. Additional UDP channels can be used to transmit haptic data from the video acquisition device 3 to the remote computer 2, or used to transmit audio data.

To this end, in step 100, the video acquisition devices send the data packet containing register signaling and avatar information (such as nickname or ID numbers of the video acquisition devices) to register the video port number of the devices on the server 1. If the video acquisition devices haven't received the request signaling from remote computers 2, the video acquisition devices 3 regularly repeat the registration. In order to maintain the first UDP channel between the video acquisition devices 3 and the nearest routers with public IP address, the intervals between the registrations are less than or equal to 3 minutes. And the server 1 records the router's IP address and video port number for the first UDP channel.

In step 200, the video acquisition devices 3 send data packets containing the register signaling and avatar information, in order to register the haptic port number of the devices on the server 1. If the video acquisition devices haven't received the request signaling from remote computers, the video acquisition devices 3 regularly repeat the registration. In order to maintain the second UDP channel between the video acquisition devices 3 and the nearest routers with public IP address, the interval between the registrations are less than or equal to 3 minutes. And the server 1 records the router's IP address and port number for the second channel.

The order of the step 100 and step 200 may be changed. After receiving data packets containing different kinds of register signaling, the server 1 sends data packets for confirmation to the video acquisition devices 3 respectively. After the registration, the server deems the video acquisition devices corresponding to the avatar information online.

A user inputs an instruction for connecting avatar into remote computers, and the instruction contains parameters, such as avatar information and username (if necessary, the instruction contains a password, and the username may be retrieved from a configuration file). Similarly, at least two UDP channels between the remote computer 2 and the nearest router with a public IP address should be established. The first UDP channel of the remote computer is used to transmit video data from the video acquisition device 3 to the remote computers 2, and the second UDP channel of the remote computers 2 is used to transmit haptic data from the remote computer 2 to the video acquisition device 3. An additional UDP channel of the remote computer 2 may be used to transmit haptic data from the video acquisition device 3 to the remote computer 2, and may also be used to transmit audio data.

In step 300, the remote computer sends a data packet containing the register signaling and the username to register the video port number of the user on the server. The server records the router's IP address and port number for the first UDP channel of the remote computer.

In step 400, the remote computer sends the data packet containing the register signaling and the username, in order to register the haptic port number of the user on the server. The server records the router's IP address and port number for the second UDP channel of the remote computer.

The order of the step 300 and step 400 can be changed. After receiving data packets containing different kinds of register signaling, the server sends data packets for confirmation to the remote computer respectively. After the registration, the server deems the user who corresponds to the username and is front of the remote computer online.

After the remote computer 2 registers video port number and haptic port number on the server 1, in step 500, according to the video acquisition device's information (also called avatar information) inputted by the user, the remote computer 2 sends a request signaling including the information about the video acquisition device to the server 1.

At this time, the server has recorded video port numbers, haptic port numbers and public IP addresses corresponding to multiple online video acquisition devices 3. According to an avatar nickname or an ID in the request signaling, the server searches the related record of the video acquisition device to be connected to the remote computer 2. If necessary, the server 1 may check whether the user corresponding to the remote computer 2 has the permission to connect to the requested video acquisition device 3. And the server 1 can also check whether the requested video acquisition device 3 is connected to another remote computer.

If the requested video acquisition device is offline, or if it is connected to another remote computer, or if the user hasn't the enough permission, the server 1 returns the request failure information, and the whole process ends.

If the requested video acquisition device is online and is idle, and if the user has the permission to connect, then in step 600, the server 1 returns a data packet for confirming the request, which contains a public IP address, video port number and haptic port number corresponding to the video acquisition device.

In step 700, according to the public IP address and port numbers corresponding to the video acquisition device, the server 1 forwards the user's request signaling to the video acquisition device, and finds out the public address and port numbers corresponding to the remote computer 2 which sends the request, and notifies the video acquisition device of them.

After the remote computer 2 and the video acquisition device have known their opposite's address information, two channels between the remote computer 2 and the video acquisition device 3 should be established to transmit video data and haptic data respectively. To this end, the remote computer 2 sends test packets to the public IP address and video port number corresponding to the video acquisition device through its first UDP channel, and sends test packets to the public IP address and haptic port number corresponding to the video acquisition device through its second UDP channel.

Similarly, the video acquisition device 3 sends test packets to the IP address and video port number corresponding to the remote computer 2 through its first UDP channel, and sends test packets to the IP address and haptic port number corresponding to the remote computer 2 through its second UDP channel.

The test packets may not arrive at the remote computer 2 or the video acquisition device 3. But with the aid of the test packets, the first UDP channel of the remote computer 2, the first UDP channel of the video acquisition device and the route of the Internet are connected and form the first channel for transmitting video data. The second UDP channel of the remote computer 2, the second UDP channel of the video acquisition device, and the route of the Internet are connected and form the second channel for transmitting haptic data. For more details about establishing channels, please refer to the well-known P2P technology.

In step 800, the video acquisition device 3 confirms that it has received the request from the user by using the first channel, and waits for the acknowledgement from the remote computer. Once receiving the confirmation, the video acquisition device 3 starts to transmit video data to the remote computer through the first channel, and waits for haptic data from the remote computer in the second channel.

After receiving the confirmation through the first channel, the remote computer sends a data packet for acknowledging to the video acquisition device 3 in step 900. And in step 1000, the remote computer sends a data packet to the server, in order to confirm the established connection. Thereafter, the remote computer waits for video data from the video acquisition device 3 in the first channel, and sends haptic data to the video acquisition device 3 through the second channel. The haptic data are a set of sample values of motion state. For example, the haptic data may be a set of sample values of tilt angle of a joystick, namely a set of sample values of given movement speed.

The remote computer 2 processes the video data received from the first channel, and presents the processed video data to the user. The user determines the next motion state of the avatar (namely the video acquisition device) according to the video information, and generates haptic information with the joystick. The haptic information is transmitted to the video acquisition device 3 through the second channel. The video acquisition device 3 processes the received haptic information. Then according to the user's intention, the video acquisition device 3 "moves" as user's avatar, and send video information which is "seen" by the avatar to the user through the first channel.

When the user doesn't want to continue to be connected with his avatar, the user inputs a disconnecting instruction: to the remote computer 2. After receiving this instruction, the remote computer 2 stops receiving video data in the first channel. And it stops sending haptic data in the second channel. In step 1100, the remote computer 2 sends a data packet containing a disconnecting signaling to the server 1. After the server 1 receives this data packet, the flag of the video acquisition device 3 is set idle by the server 1. If necessary, the server 1 calculates the duration of the connection between the user and the avatar, which is used to the subsequent processing such as billing.

In addition, in step 1200, the remote computer 2 sends a data packet containing a disconnecting signaling to the video acquisition device 3. After receiving the data packet, the video acquisition device 3 stops sending video data in the first channel. And it stops receiving haptic data in the second channel and registers video port number and haptic port number on the server regularly. The server deems the video acquisition device 3 online.

When the video acquisition device 3 is online and idle, with a remote computer having access to the Internet, another user can transform the video acquisition device 3 into his avatar.

LIST OF REFERENCE NUMERALS

1 server
2 remote computer
21 joystick
3 video acquisition device
31 video input unit
31 computing unit
33 electromechanical unit
4 communication network
100 video acquisition devices register visual address information on the server
200 video acquisition devices register haptic address information on the server
300 the remote computer registers visual address information on the server
400 the remote computer registers haptic address information on the server
500 the remote computer sends request signaling
600 the server responses to request signaling
700 the server forwards request signaling
800 the video acquisition device confirms request signaling for computer
900 the remote computer acknowledges for video acquisition device
1100 the remote computer sends disconnecting signaling to the server
1200 the remote computer sends disconnecting signaling to the video acquisition device While the invention has been described above by reference to various embodiments, it is intended that the foregoing detailed description be regards as illustrative rather than limiting. It should be understood that many changes and modifications can be made without departing from the spirit and scope of the invention as defined by the appended claims.

The invention claimed is:

1. A method for transmitting video data and haptic data between mobile video acquisition devices (3) and remote computers (2) through a communication network (4), wherein a server (1) capable of direct communication exists in the communication network (4), and the video data are presented on a screen of a remote computer (2) for a user to view, and the haptic data are used to control the motion state of a video acquisition device (3); and the mobile video acquisition device (3) comprises an electromechanical unit for moving, an input unit for acquiring video data, a computing unit for processing video data and haptic data, and a communication unit;

the method comprising:
registering, by the video acquisition devices (3), visual address information and haptic address information on the server (1) respectively and regularly;
inputting, by a user, an identification of a video acquisition device into a remote computer (2); registering, by the remote computer (2), visual address information and haptic address information on the server (1) respectively; sending, by the remote computer (2), a request signaling containing the identification of the video acquisition device to the server (1);
searching, by the server (1), the visual address information and the haptic address information corresponding to the video acquisition device (3) according to the identification of the video acquisition device, and informing the remote computer (2) of the visual address information and the haptic address information;
informing, by the server (1), the video acquisition device (3) of the request signaling, the visual address information and the haptic address information corresponding to the remote computer (2), according to the identification of the video acquisition device;
establishing, by the remote computer (2) and the video acquisition device (3), a first channel for transmitting the video data directly and a second channel for transmitting the haptic data directly, according to the visual address information and the haptic address information from the server (1);
sending, by the video acquisition device (3), the video data to the remote computer (2) directly by using the first channel; and sending, by the remote computer (2), the haptic data to the video acquisition device (3) directly by using the second channel; wherein the haptic data are a set of sample values of state.

2. The method as claimed in claim 1, wherein the address information comprises an IP address and a port number.

3. The method as claimed in claim 1, wherein the video data comprise a plurality of compressed data of video frames, and the compressed data of video frames can be divided into a plurality of groups of data packets which match the bandwidth, and the groups of data packets are sent at intervals of given time, and if compressed data for the last video frame hasn't been sent, compressed data of newly acquired video frame are not sent to the remote computer.

4. The method as claimed in claim 1, wherein the video data acquired by the video acquisition device (3) are stored in the video acquisition device (3), and part of the video data is transmitted to the remote computer (2), and the user sends the haptic data to the video acquisition device (3) according to the received video data.

5. The method as claimed in claim 1, wherein the motion state comprises moving velocity and direction.

6. The method as claimed in claim 1, wherein the video acquisition device (3) sends the haptic data acquired by sensors for the actual motion state to the remote computer (2).

7. The method as claimed in claim 1, wherein the identification of the video acquisition device is a nickname string of the video acquisition device.

8. The method as claimed in claim 1, wherein the identification of the video acquisition device is digital number of the video acquisition device.

9. The method as claimed in claim 1, wherein the server (1) manages access permissions of the remote computers (2) and the video acquisition devices (3).

10. A mobile video acquisition device (3), comprising an electromechanical unit for moving, an inputting unit for acquiring video data, a computing unit for processing the video data and haptic data, and a communication unit for receiving and sending video data and the haptic data, wherein the video acquisition device is connected with the communication network (4) and transmits the video data and the haptic data according to the method as claimed in claim 1.

* * * * *